United States Patent [19]

Christeson

[11] Patent Number: 5,822,581

[45] Date of Patent: *Oct. 13, 1998

[54] METHOD FOR CMOS CONFIGURATION INFORMATION STORAGE AND RETRIEVAL IN FLASH

[75] Inventor: Orville Christeson, Portland, Oreg.

[73] Assignee: Intel Corporation, Santa Clara, Calif.

[ * ] Notice: The term of this patent shall not extend beyond the expiration date of Pat. No. 5,579,522.

[21] Appl. No.: 537,095

[22] Filed: Sep. 29, 1995

[51] Int. Cl.$^6$ ........................................ G06F 9/06
[52] U.S. Cl. ............................................... 395/651
[58] Field of Search .................... 395/651, 652, 395/653, 200.5, 200.51, 200.52, 712

[56] References Cited

U.S. PATENT DOCUMENTS

| | | | |
|---|---|---|---|
| 4,153,937 | 5/1979 | Poland | 364/706 |
| 4,290,104 | 9/1981 | Holtey et al. | 364/200 |
| 4,374,417 | 2/1983 | Bradley et al. | 364/200 |
| 4,441,155 | 4/1984 | Fletcher et al. | 364/200 |
| 4,443,847 | 4/1984 | Bradley et al. | 364/200 |
| 4,608,632 | 8/1986 | Kummer | 364/200 |
| 4,763,333 | 8/1988 | Byrd | 371/66 |
| 4,799,145 | 1/1989 | Goss et al. | 364/200 |
| 4,831,522 | 5/1989 | Henderson et al. | 364/200 |

(List continued on next page.)

FOREIGN PATENT DOCUMENTS 0524719  1/1993  European Pat. Off. .......... G06F 9/44

OTHER PUBLICATIONS

Markus A. Levy, "Designing with Flash Memory", *Circuit Cellar Ink,* Dec. 1990, pp. 50–58.

Jerry Jex, "Flash Memory BIOS for PC and Notebook Computers", *IEEE,* 1990, pp. 692–695.

Waite, et al., "Soul of CP/M", *The Waite Group,* 1983, pp. 177–182 and 279–322.

Brett Glass, "The IBM PC BIOS", *Byte,* Apr. 1989, pp. 303–310.

Gus Venditto, "Pipeline", *PC Magazine,* vol. 9, No. 3, Feb. 13, 1990, pp. 1–3.

Bill Machrone, "Bill Machrone", *PC Magazine,* vol. 9, No. 7, Apr. 10, 1990, pp. 1–2.

Gus Venditto, "Intel's Flash Memory Poised To Give Laptops Their Next Great Leap", *PC Magazine,* vol. 9, No. 14, Aug. 1990, pp. 1–3.

John H. Wharton, "Flash! memory technology marches on", *Microprocessor Report,* vol. 4, No. 13, Aug. 8, 1990, pp. 1–4.

Samuel Weber, "Look Out EPROMs, Here Comes Flash", pp. 44, 46, 50; *Electronics Magazine* (Nov. 1990).

Jack Shandle, "Laptop Vendors Join the Flash Bandwagon", pp. 52–53; *Electronics Magazine* (Nov., 1990).

*Primary Examiner*—Kevin A. Kriess
*Attorney, Agent, or Firm*—Blakely, Sokoloff, Taylor & Zafman

[57] ABSTRACT

A computer system is provided for storing CMOS configuration information in FLASH and for retrieving a copy of the CMOS configuration information stored in FLASH into a CMOS RAM memory. The computer system includes a processor, a computer readable CMOS RAM memory device coupled to the processor, the CMOS RAM devices having system configuration information programmed therein. The computer system further includes a computer readable RAM memory device coupled to the processor, a computer readable non-volatile memory device coupled to the processor, the non-volatile memory having a first block of memory including CMOS RAM configuration information programmed therein. The computer system further includes: means for reading the content of the non-volatile memory device, the means for reading being coupled to the processor; means for erasing a specified block of the non-volatile memory device, the means for erasing being coupled to the processor; and means for writing the CMOS RAM configuration information in the non-volatile memory, the means for writing being coupled to the processor.

26 Claims, 5 Drawing Sheets

U.S. PATENT DOCUMENTS

| | | | |
|---|---|---|---|
| 4,862,349 | 8/1989 | Foreman et al. | 364/200 |
| 5,034,915 | 7/1991 | Styrna et al. | 364/900 |
| 5,053,990 | 10/1991 | Kriefels et al. | 364/900 |
| 5,117,492 | 5/1992 | Nash | 395/400 |
| 5,126,808 | 6/1992 | Montalvo et al. | 357/23.5 |
| 5,134,580 | 7/1992 | Bertram et al. . | |
| 5,136,713 | 8/1992 | Bealkowski et al. | 395/700 |
| 5,142,680 | 8/1992 | Ottman et al. | 395/700 |
| 5,210,875 | 5/1993 | Bealkowski et al. | 395/700 |
| 5,257,378 | 10/1993 | Sideserf et al. | 395/700 |
| 5,269,022 | 12/1993 | Shinjo et al. | 395/652 |
| 5,355,489 | 10/1994 | Bealkowski et al. | 395/652 |
| 5,371,876 | 12/1994 | Ewertz et al. . | |
| 5,432,927 | 7/1995 | Grote et al. | 395/652 |
| 5,469,573 | 11/1995 | McGill, III et al. | 395/651 |
| 5,479,639 | 12/1995 | Ewertz et al. | 395/430 |
| 5,564,054 | 10/1996 | Bramnick et al. | 395/652 |
| 5,566,335 | 10/1996 | Nash et al. | 395/651 |
| 5,579,522 | 11/1996 | Christeson et al. | 395/652 |

Tehnical

METHOD FOR CMOS CONFIGURATION INFORMATION STORAGE AND RETRIEVAL IN FLASH

BACKGROUND OF THE INVENTION (1) Field of the Invention

The present invention relates to the field of computer systems. More specifically, the present invention relates to the field of computer system architectures incorporating a non-volatile memory device for storing system configuration information.

(2) Description of the Related Art

Many computer systems are typically configured at a minimum with a processor, a random access memory device, and a read only memory device. Read only memory devices (ROM) provide a non-volatile form of memory that is not destroyed when power is removed from the computer system. Conventional computer systems are typically initialized (i.e. powered up) using the processing logic (i.e. firmware) stored within the ROM device internal to the computer system. Since the ROM device is non-volatile, the firmware within the ROM is guaranteed to contain valid data or instructions. Prior art computer systems can, thus, be reliably initialized using the firmware within the ROM.

Generally, the firmware stored in the ROM can be a basic input-output system (BIOS) software program. The BIOS is an operating system processing logic that provides the lowest level of software control over the hardware and resources of the computer system. With an open-system computer, such as a system which can have its configuration changed by adding or deleting either hardware or software components, the BIOS needs to have information about the current configuration. Historically, this information has been stored in CMOS memory. CMOS memory is capable of retaining information, during periods of time when the computer system is not running, by means of a small current provided by a battery.

One computer system stores the BIOS into a non-volatile memory device such as FLASH. Such computer system is developed by Intel Corporation of Santa Clara, Calif. This computer system is explained in detail in a patent application having Ser. No. 07/695,952.

Beginning with the original AT computer, a certain amount of configuration information was stored in battery-backed CMOS RAM. The shortcoming of this arrangement is that when the battery is exhausted, the configuration information stored in the CMOS RAM is lost. Battery life is generally greater than one year. Because of this relatively long time, most users typically forget the content of the configuration information contained in the CMOS RAM by the time the battery's life expires. Accordingly, it is difficult to recreate a lost image of the configuration information contained in the CMOS RAM. Therefore, it is desirable to create a backup image of the configuration information stored in the battery-backed CMOS RAM. A preferable place to store the backup image would be a non-volatile memory such as FLASH.

Historically, the CMOS memory has been located in the same device which contains the Real Time Clock (RTC), a battery-backed clock which maintains the time and date independent of whether or not the computer system is powered on. Most operating systems have their own time keeping mechanism, which retrieves the initial time and date from the RTC when the system is powered on. By contrast, in systems connected to a network, the system time is set from the network upon logging onto the network. While network systems do not need the RTC, these systems still need the configuration information stored in the CMOS RAM. Accordingly, if a mechanism was provided for obtaining the configuration information without having to take recourse to the CMOS RAM, then batteries, in systems that are connected to a network, could be eliminated.

BRIEF SUMMARY OF THE INVENTION

The present invention includes a computer system wherein the CMOS RAM configuration information is backed up in a non-volatile memory device. The computer system according to the present invention includes a processor coupled to a computer readable CMOS RAM memory device. The CMOS RAM device has system configuration information programmed therein. The computer system further includes a computer-readable RAM memory device coupled to the processor.

The computer system also includes a computer-readable non-volatile memory device coupled to the processor. The non-volatile memory device has a first block of memory including CMOS RAM configuration information programmed therein. The computer system further has: means, coupled to the processor, for reading the content of the non-volatile memory device; means, coupled to the processor, for erasing a specified block of the non-volatile memory device; and means, coupled to the processor, for writing the CMOS RAM configuration information stored or backed up in the non-volatile memory.

The means for reading the information also includes a manual reading processing logic residing at a first location within said second block of said non-volatile memory device. The means for reading further includes automatic reading processing logic residing at a second location within said second block of said non-volatile memory device. The means for writing includes a writing processing logic residing at a third location within said second block of said non-volatile memory device.

The present invention also provides for a computer implemented process for storage and retrieval of CMOS configuration information in a computer system which includes a processor, a computer readable CMOS RAM device coupled to the processor, the CMOS RAM device having system configuration information programmed therein. The computer system further has a computer readable RAM device coupled to the processor, a computer readable non-volatile memory device coupled to the processor, the non-volatile memory having a first block of memory including a CMOS RAM configuration information programmed therein. The non-volatile memory device also has a second block of memory including manual reading processing logic, automatic reading processing logic, basic operating system processing logic, and CMOS default data. The computer implemented process for storage and retrieval of CMOS configuration information includes the steps of: (a) selecting either a manual reading mode or a manual writing mode; (b) activating the manual reading processing logic, if a manual reading mode was selected at step (a); (c) loading information from the first block of memory of the non-volatile memory to the CMOS RAM device if the manual reading processing logic has been activated; (d) activating the manual writing processing logic if a manual writing mode was selected at step (a); and (e) writing said CMOS RAM device with information from the first block of memory if the manual writing processing logic has been activated.

BRIEF DESCRIPTION OF THE DRAWINGS

The features, aspects, and advantages of the present invention will become more fully apparent from the following detailed description, appended claims, and accompanying drawings.

DETAILED DESCRIPTION OF THE INVENTION

In the following description, numerous specific details are set forth to provide a thorough understanding of the present invention. However, one having an ordinary skill in the art may be able to practice the invention without these specific details. In some instances, well-known circuits, structures, and techniques have not been shown in detail to not unnecessarily obscure the present invention.

The present invention is a computer system wherein a portion of a non-volatile memory is adapted to store a copy of the configuration information that resides in the CMOS RAM. This configuration information contains, by way of non-limiting example, information about the type of devices included in the system such as e.g., floppy drives, hard drives, keyboard, mouse, monitor, etc., as well as information regarding certain user options and/or preferences. The CMOS RAM information is programmed into the non-volatile memory upon a user's request for programming the contents of the CMOS RAM into that non-volatile memory. The CMOS RAM information programmed into the non-volatile memory can be retrieved into the CMOS RAM upon occurrence of certain conditions. Generally, the CMOS RAM information can be retrieved upon the selection of a reading mode and the activation of a reading processing logic. The reading mode can be either user activated, which requests user's input, or automatic. The automatic mode is triggered by the computer system itself upon occurrence of certain conditions.

Figure 1:
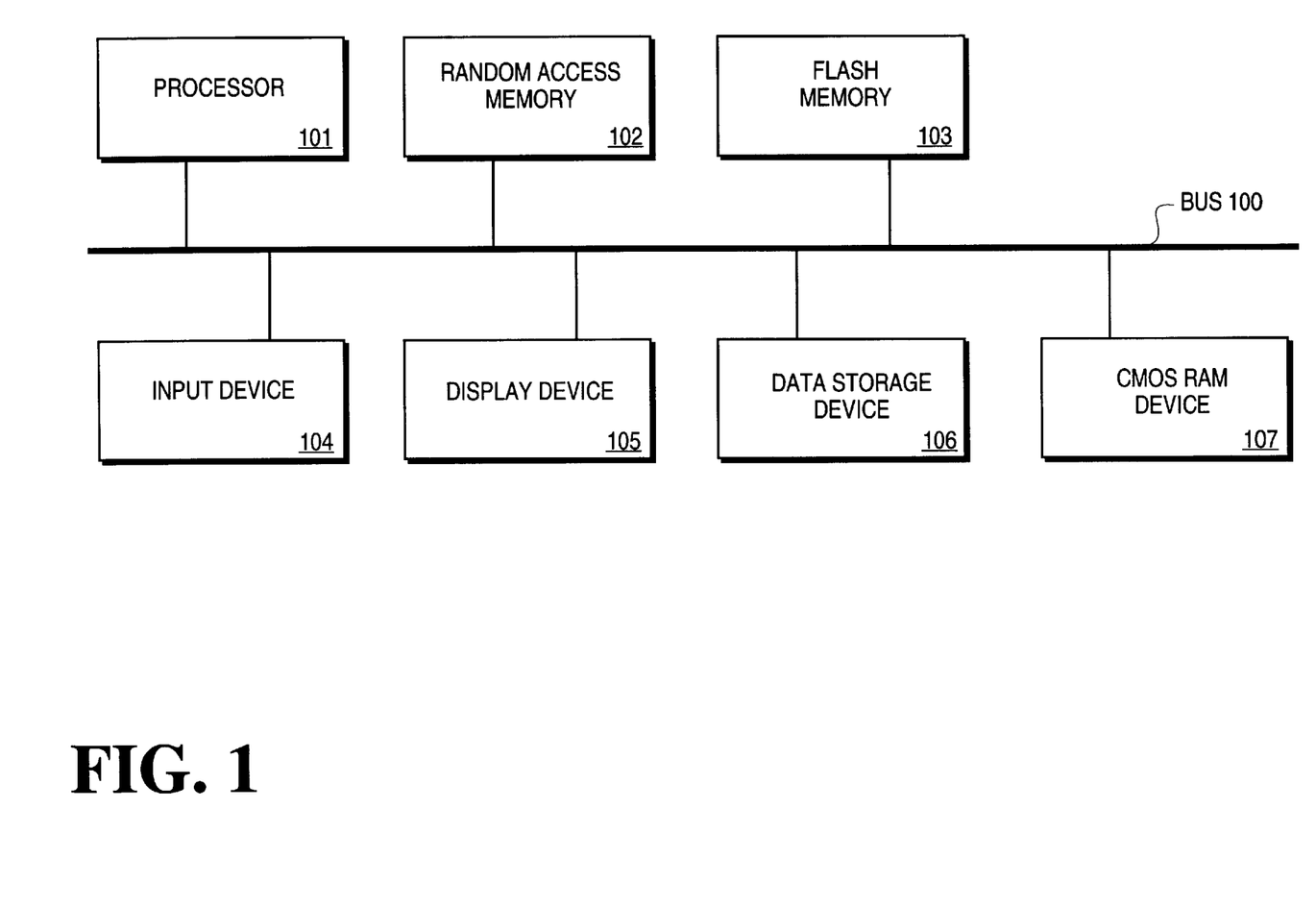
FIG. 1 is an illustration of a computer system of the present invention.

Referring to FIG. 1, a block diagram of the computer system of the present invention is illustrated. The preferred embodiment of the present invention is implemented using a microprocessor manufactured by Intel Corporation of Santa Clara, Calif. It will be apparent to those with ordinary skill in the art, however, that alternative processors and computer system architectures may be employed. In general, such computer systems as illustrated in FIG. 1 include a bus 100 for communicating information, a processor 101, coupled with the bus, for processing information, a random access memory device 102, coupled with the bus 100, for storing information and instructions for the processor 101, an input device 104 such as an alpha numeric input device or a cursor control device, coupled to the bus 100, for communicating information and command selections to the processor 101, a display device 105, coupled to the bus 100, for displaying information to a computer user, a data storage device 106 such as a magnetic disk and disk drive coupled with the bus 100 for storing information and instructions, and a CMOS RAM device 107 coupled with the bus 100 for storing system configuration information.

In addition, the computer system of the preferred embodiment includes FLASH memory device 103 coupled to the bus 100 for storing, in a non-volatile form, code and data. FLASH memory device 103 provides a non-volatile form of memory that can preserve the information stored therein intact even when power is removed from the computer system. The contents of FLASH memory however, may be erased and reprogrammed using a dedicated set of electrical signals.

Several different types of FLASH memory devices exist in the art. Many prior art FLASH memory devices only allow complete erasure and reprogramming of all memory locations of the device. Other FLASH memory devices, however, are partitioned into separately erasable and programmable blocks of memory in a single FLASH memory device. Such a feature is particularly preferable for CMOS RAM storage and retrieval. FLASH is the preferred non-volatile storage device for backing up the CMOS RAM configuration information according to the present invention. In addition, other system software (e.g. BIOS) and application specific parameters may also be stored in FLASH memory 103.

In the preferred embodiment of the present invention, a partitioned FLASH memory device which is selectably erasable, such as the FLASH memory device denoted 28F001BT, can be used. The 28F001BT FLASH memory device is a 1M-bit memory device manufactured by the Intel Corporation of Santa Clara, Calif. It will be apparent to those skilled in the art that other forms of reprogrammable non-volatile memory devices may be used with the invention taught herein.

Figure 2:
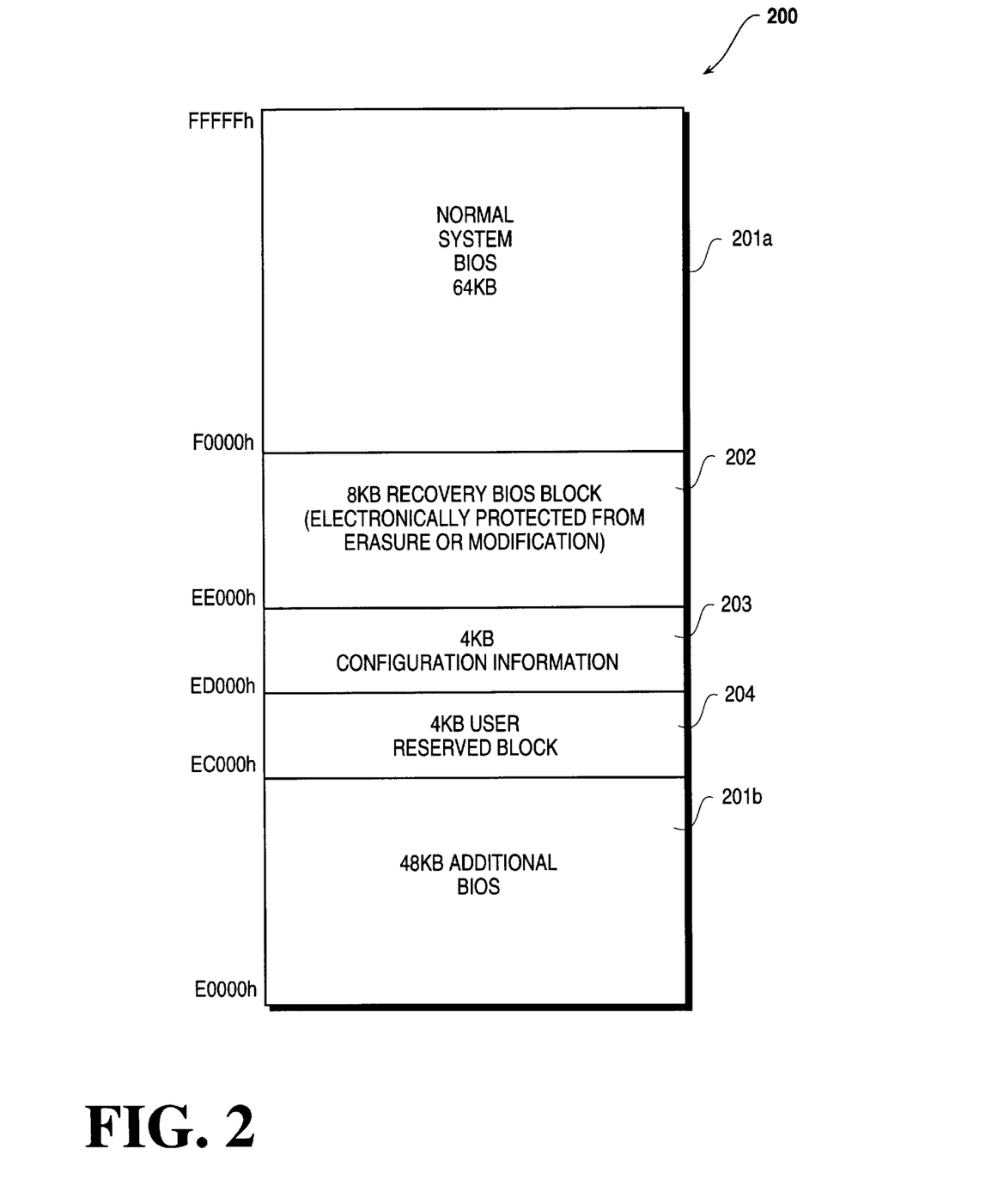
FIG. 2 is an illustration of a memory map of the configuration information and BIOS in the FLASH memory device used in the preferred embodiment.

Referring to FIG. 2, five separately erasable/programmable non-symmetric blocks of the FLASH memory device of the preferred embodiment are illustrated. This configuration allows the processing logic of the computer system to update or modify any selected block of memory without affecting the contents of other blocks. Blocks 201a and 201b include the BIOS which comprises processing logic instructions that are executed by the processor. When the computer system of the preferred embodiment is first powered up, the processor begins fetching code from location FFFFFFF0h and starts execution. In order to handle the initialization of the computer system, the active system BIOS must therefore include the location FFFFFFF0h. The processor (not shown) jumps to a location within a normal system BIOS 201a on power up or reset of the processor. Processing logic within region 201a may be used to handle normal initialization and control functions of the computer system. The BIOS can also include, in block 201a, the programs SETUP and POST which will be explained later in this section.

Electronically protected (i.e. locked) FLASH memory area 202 is an area for storage of a recovery BIOS used for recovery operations. This block may be electronically locked to prevent erasure or modification of its contents once it is installed. This feature is explained in greater detail in a patent application Ser. No. 07/695,952 of the assignee of the present invention. Area 203 is a block of the non-volatile memory device (FLASH) which is used to store various kinds of configuration information as well as certain vital product data. Vital product data can include, for example: system serial number, asset tags, etc. Separately programmable area 204 is a memory area reserved for use by a particular user or application.

There are two modes for triggering the CMOS RAM configuration information storage and retrieval according to the present invention—a manual mode, or user interface mode, and an automatic mode. The difference between these two modes is the user interface. In the user interface mode, the keyboard and video services of the computer system are available for receiving command selections and displaying results. By means of this user interface, upon selection of a command triggering a manual processing logic, the system will store the configuration information from the CMOS RAM into the FLASH and vice-versa. Such processing logic can be by way of non-limiting example, a first generic processing logic, such as a SETUP program containing certain options which will be explained in more detail later in this section. The user can, through an option in SETUP, cause the configuration information in CMOS RAM to be stored in FLASH. SETUP is a program which provides the means for the user to tell the computer how the system is configured, to specify that certain options be enabled or disabled, and to set up any user-specified preferences. The SETUP program according to the present invention then modifies the contents of CMOS RAM memory which another program POST, which will be explained later in this section, references during its execution. The SETUP program according to the present invention provides an additional option to reprogram or rewrite the CMOS memory based on the FLASH image. The CMOS RAM is not changed by SETUP unless the user specifically directs the system, by means of the user interface, to copy the information from the FLASH into CMOS RAM. If the configuration information from the CMOS RAM is changed, then a new back up to the FLASH would be required.

Moreover, BIOS is configured so that when it detects that the configuration information stored in the CMOS RAM is invalid, it automatically loads the CMOS RAM from the FLASH, if the FLASH has the CMOS RAM configuration information programmed therein. The detection and loading of the CMOS RAM information from the FLASH can be performed by an automatic reading processing logic such as POST. This processing logic can include a second generic processing logic which can automatically load the CMOS RAM from the FLASH upon the occurrence of certain condition such as, by way of non-limiting example, the determination that the configuration information from the CMOS RAM is not valid upon powering up the system. POST an acronym from Power-On-Self Test, is a part of BIOS which tests and initializes the various components of a computer system when the system is first powered on. As part of the BIOS, POST resides in the non-volatile memory device--FLASH in the preferred embodiment according to the present invention. SETUP, in the preferred embodiment according to the present invention, also resides in the block of non-volatile memory device dedicated to BIOS. However, SETUP could also reside on disk.

The automatic processing logic, such as POST, is activated differently than the SETUP program. While SETUP is activated as a result of a direct action by a user, POST is activated automatically each time the system is powered on or reset. Restoring CMOS according to the system and method of the present invention, can be implemented such that each time the system boots, an option can be set up such that the CMOS information can be automatically restored from FLASH during POST. Alternatively, the system can be set up such that, if CMOS is not valid at the start of POST, an attempt can be made to restore the CMOS data from the backup image stored in the FLASH.

Figure 3:
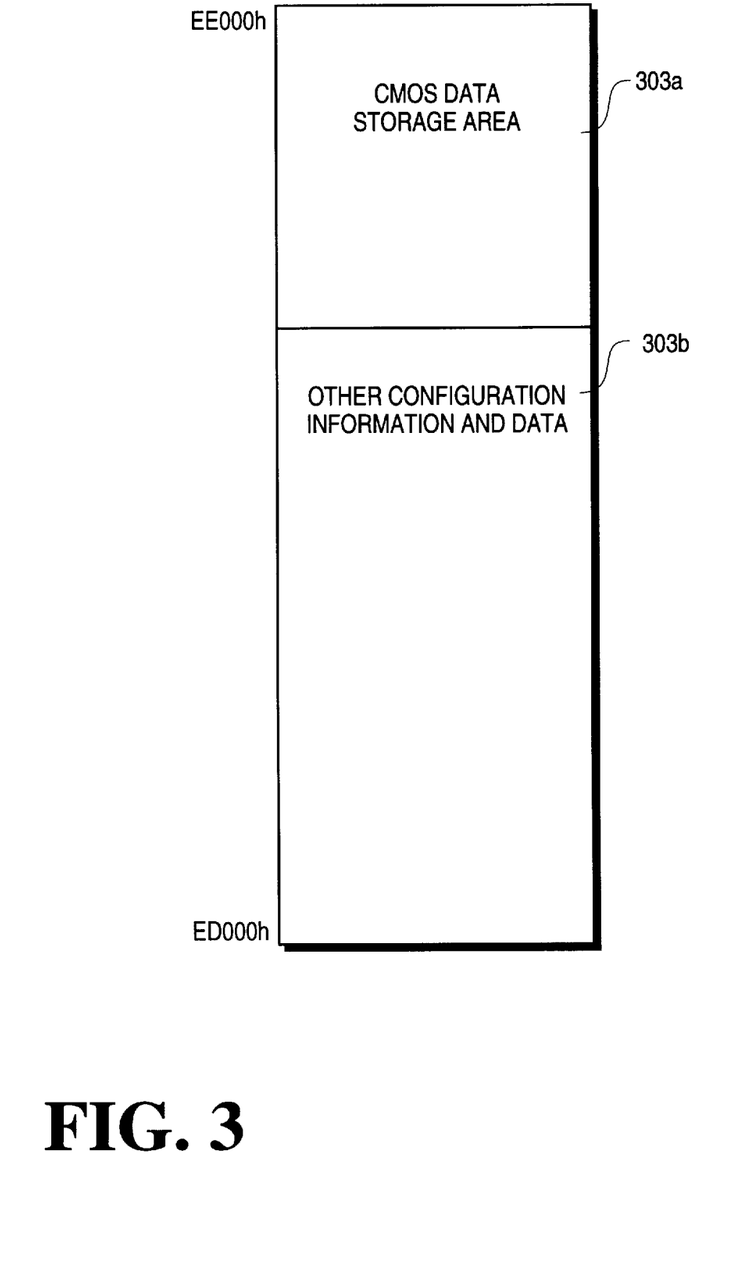
FIG. 3 is an illustration of the memory map of the configuration information area.

The present invention can also be used in customizing systems. One can customize the configuration of a system by storing the custom information in the FLASH area 303 allocated for the configuration information and shown in FIG. 3. FIG. 3 illustrates the configuration information block 203 of FIG. 2 partitioned into two sub-blocks. The sub-block 303a typically is programmed, at the time of manufacturing, with custom defaults. This sub-block is also called a Product Information area. Users, however, can also program this sub-block with a desired configuration information, i.e., user custom CMOS defaults, as sub-block 303a is erasable. If this sub-block is not programmed by the user with the custom CMOS defaults, defaults can be loaded from BIOS into the CMOS RAM, as BIOS itself contains BIOS CMOS defaults. Block 303b contains a sub-block wherein other types of configuration and/or data can be stored. For example, sub-block 303b could contain information related to plug and play and PCI.

It should be noted that for different implementations that use devices which contain larger amounts of CMOS memory such as 256 bytes instead of 128 bytes, the CMOS data storage area illustrated in FIG. 3 would be larger and could be located at a different address. In the preferred embodiment according to the present invention, the CMOS configuration information can be stored in a block of 128 bytes. However, in systems that use more information for the system configuration, one could use 256 bytes.

The storage of the CMOS image to the FLASH can be performed according to the following steps. First the current contents of the FLASH block containing the CMOS image is copied to a buffer in RAM 102 shown if FIG. 1. Next the new CMOS image is overlaid onto the CMOS portion of the buffer and the entire area is checksummed. Once all of this is done, the FLASH block is erased and then written with the buffer containing the new CMOS image.

In the normal operation of the computer system of the preferred embodiment, processor 101 initially executes instructions out of the normal system BIOS region 201a of FLASH memory 103. Subsequently, a full-featured operating system may be read from data storage device 106 into random access memory (RAM) 102 and executed from RAM 102. Once the full-featured operating system is transferred and running in random access memory 102, other application executable files and data files may be accessed in data storage device 106. One such executable file could access the storage and retrieval processing logic of the present invention by means of a BIOS API (Application Programming Interface). The storage and retrieval processing logic may be activated and executed using APIs for each of the desired operations, i.e. for storage and for retrieval. The BIOS APIs pertaining to the present invention are included at the end of this section. Other APIs, however different than those included at the end of this section, could be defined for accessing the processing logic for storing and retrieving CMOS information.

As indicated above, the preferred embodiment operates in two basic modes: a manual mode and an automatic mode. The automatic mode, for example, can always be set to operate in certain conditions. For example, if the BIOS, during its execution of POST, finds the contents of the CMOS memory to be invalid, it will check to see if the non-volatile memory device (FLASH) contains a backup of the CMOS image. If so, the BIOS will automatically copy its contents into the CMOS memory and continue to boot the system. However, if no backup copy of the CMOS memory exists in FLASH, BIOS defaults will be loaded into CMOS, a warning message will be posted, and the user will have the choice of running the SETUP program and configuring the system to his liking or booting with the default configuration.

The contents of CMOS memory can also be restored manually when the manual mode is selected, by running the SETUP program and selecting the option to restore CMOS from FLASH. Also, once users have the system configured to their liking, the users can select an option, within SETUP, to save the current CMOS image to FLASH. The manual storage and recovery of the CMOS image to the FLASH and from the FLASH will be explained in conjunction with FIG. 4.

Figure 4:
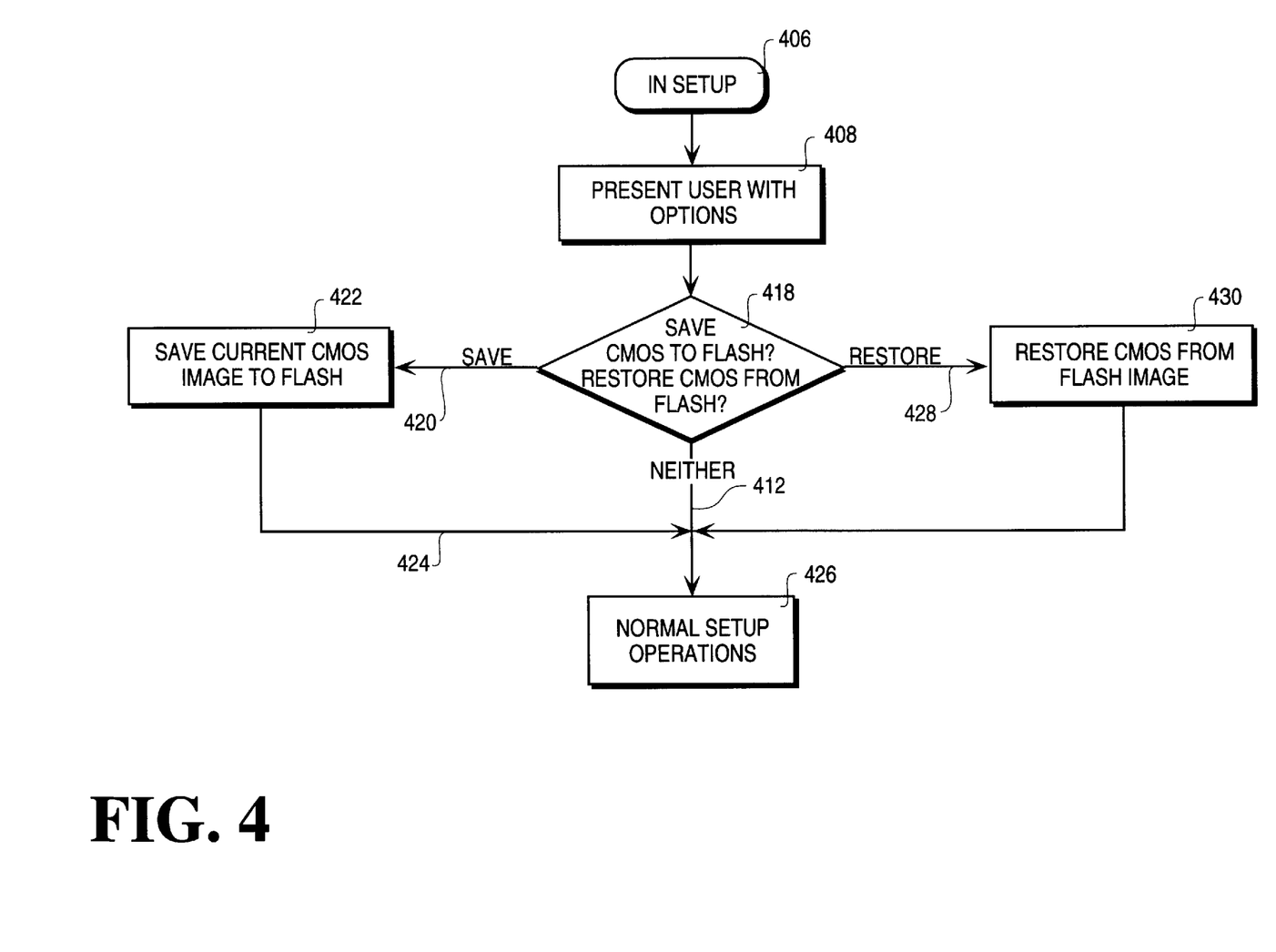
FIG. 4 is a flow chart of the user activated processing logic of the present invention.

FIG. 4 illustrates a block diagram of the manual processing logic which can include, by way of non-limiting example, the SETUP program. The manual storage and retrieval program of the present invention starts at block 406 on activation. Once in SETUP a main menu of normal options are displayed to the user. A menu selection can then be retrieved from the input device 104, shown in FIG. 1. In SETUP users have two options, in addition to other typical SETUP options, presented at block 408, with regard to CMOS and FLASH: one option, at block 422, is to save the current contents of CMOS memory to FLASH, the other option at block 430 is to restore CMOS from FLASH. The user can select either option or none. A suggested course of action would be to save the CMOS memory to FLASH once the system is configured to the user's liking. Then, if CMOS becomes corrupted or looses its contents, it can easily be restored from FLASH. If neither the "save CMOS image to FLASH" nor the "retrieve CMOS image from FLASH" is chosen, the processing path 412 is taken to block 426.

If the user, however, decides to save the CMOS information to FLASH, processing path 420 is taken to block 422. The current CMOS image is saved to FLASH by activating a "save CMOS Information" processing logic which, by way of non-limiting example, can be a BIOS API procedure accessed through a processor interrupt (INT 15). This procedure will be provided below at the end of this section. The APIs provide some level of security so that the information, once stored into FLASH, cannot casually or maliciously be altered or erased. Some special operations must be performed before an application program, other than BIOS or SETUP, can write the area in FLASH containing the backed up CMOS image. At the end of this process, the processing path 424 is taken to block 426, where normal SETUP operations can be selected.

If the restore operation however has been selected by the user at the decision block 418, the processing path 428 is taken to the block 430. At this block, a "Retrieve CMOS Information" processing logic, which in this case is also another BIOS API sub-routine, is executed. This procedure is also provided at the end of this section.

The APIs can be used during the manufacturing or configuration process. APIs can be used in conjunction with a variety of operations. For example, the "Retrieve CMOS Information" API allows the CMOS image to be retrieved from the CMOS RAM device (the RTC) or from the area of the FLASH dedicated to Product Information in sub-block 303a. This information could be read into a file and manipulated for a particular configuration and then written back into the FLASH using the "Store CMOS Information" API. A "Force CMOS Defaults" API provides the ability to force desired defaults into the CMOS memory. These defaults can be BIOS, manufacturing, or custom CMOS defaults. While the custom defaults, which represent the image that is stored in FLASH in the Product Information area can be altered through the former APIs, the BIOS defaults and manufacturing defaults in the BIOS cannot be altered.

Figure 5:
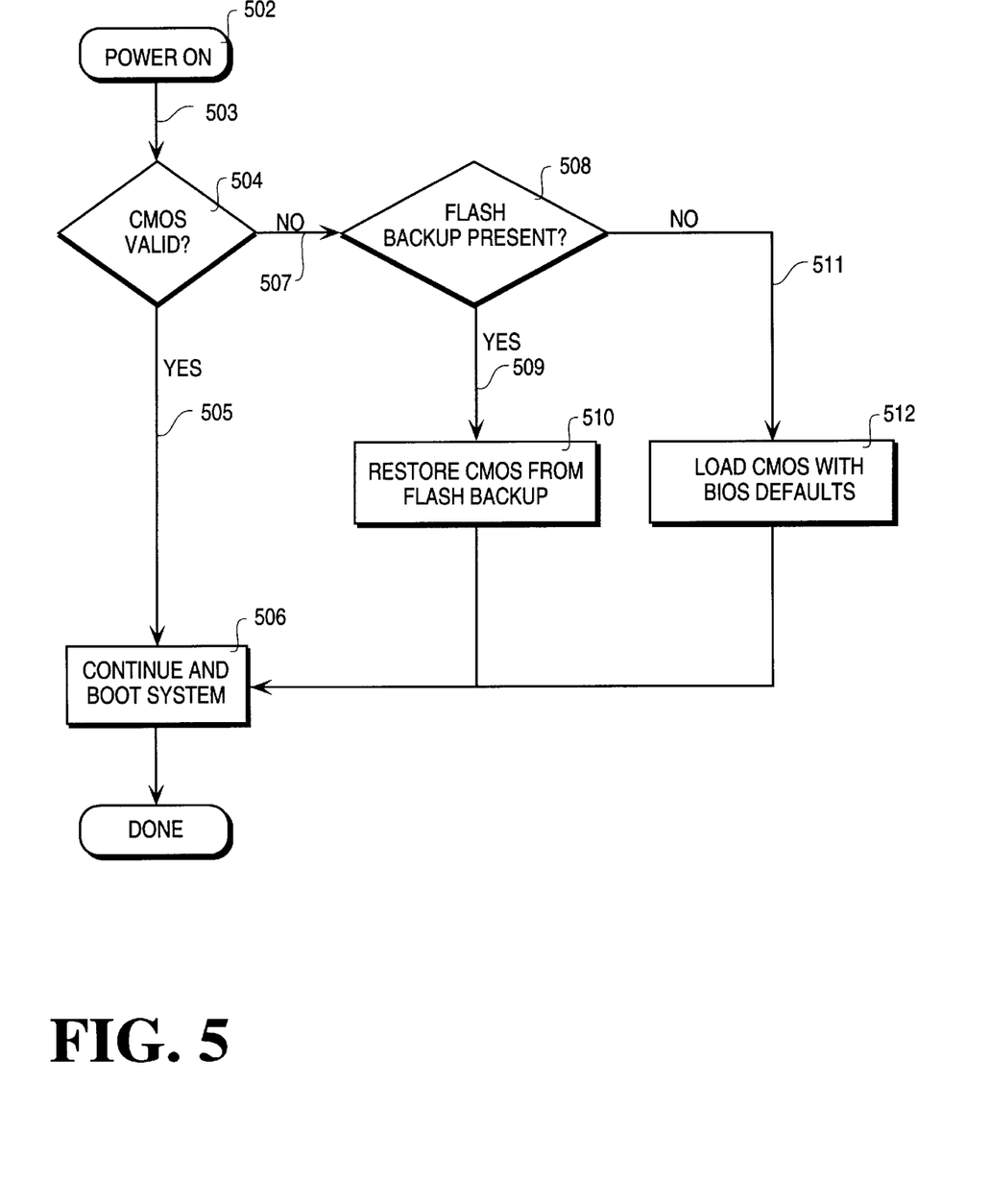
FIG. 5 is a flow chart of the automatic processing logic of the present invention.

FIG. 5 shows a flowchart diagram of the automatic processing mode. As one can see from this figure, when the system is powered up, at block 502, processing path 503 is taken to decision block 504 wherein the computer system checks whether the configuration information in the CMOS RAM is valid. When the system is turned on or reset the CMOS image is checked for validity. First the BIOS checks if the battery has lost power since the system was last turned off. If so, the contents of CMOS are assumed to be invalid. If the battery has not lost power, a checksum test is performed on the contents of the CMOS memory to determine if any information has been corrupted. If the checksum test fails, the contents of CMOS are assumed to be invalid. If both these tests pass, the contents of CMOS are assumed to be valid and they are used during the POST process after taking processing path 505 to the processing block 506 where the system is booted up. If either of the tests fail, processing path 507 is taken to decision block 508 where the BIOS will check to see if there is a backup copy of the CMOS memory in FLASH. If the CMOS image information is contained in the FLASH, then processing path 509 is taken to block 510. The system then restores the CMOS from the FLASH backup. However, if the FLASH backup is not present in the FLASH device, processing path 511 is taken to block 512. In this case, the system loads the CMOS RAM with the BIOS defaults. As mentioned earlier, a BIOS default CMOS image is contained in the block of the FLASH which contains the normal system BIOS 201a shown in FIG. 2.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

| Subfunction 26H - Retrieve CMOS Information | | |
|---|---|---|
| Call With: | AH = | DAh |
| | AL = | 26h |
| | EBX = | ID string: "CMOS" (534F4D43 hex) |
| | CL = | 0 Retrieve CMOS image from the RTC |
| | | 1 Retrieve CMOS image from the Product Information area |
| | ES = | Segment of Read Data Buffer |
| | DI = | Offset of Read Data Buffer (128 bytes) |
| | EDX = | Validation string "SOMC" (434D4F53 hex) |
| Returns: | EXB = | Length of Working Buffer (in bytes) required for Information Storage (ignore unless preparing to store new image) |
| | CF = | 0 - AH = 00h Successful |
| | CF = | 1 - AH = 86h (Function not supported) |
| Subfunction 27H - Save CMOS Information | | |
| Call With: | AH = | DAh |
| | AL = | 27h |
| | EBX = | ID. string: "CMOS" (534F4D43 hex) |
| | ES = | Segment of Working Buffer |
| | DI = | Offset of Working Buffer (DWORD aligned) |
| | ECX = | Length of Working Buffer in Bytes (DWORD sized) (Working Buffer must be filled with repeating EBX pattern) |
| | DS = | Segment of Write Data Buffer |
| | SI = | Offset of Write Data Buffer (128 bytes) |
| | EDX = | Validation string "SOMC" (434D4F53 hex) |
| Returns: | CF = | 0 - AH = 00h Successful |
| | CF = | 1 - AH = 86h (Function Not Supported) Any Error |
| Subfunction 29H - Force CMOS Defaults | | |
| Call With: | AH = | DAh |
| | AL = | 29h |
| | EBX = | ID string: "CMOS" (534F4D43 hex) |
| | CL = | 0 Do NOT Force CMOS Defaults |

-continued

|  |  |  |
|---|---|---|
|  |  | 1 Force BIOS CMOS Defaults |
|  |  | 2 Force Custom CMOS Defaults (from Product Information Area) |
|  |  | 3 Force Manufacturing CMOS Defaults |
|  | ES = | Segment of 8K Working Buffer |
|  | DI = | Offset of 8K Working Buffer (DWORD aligned) |
|  | EDX = | Validation string "OMCS" (4F4D4353 hex) |
| Returns: | CF = | 0 – AH = 00h Successful |
|  | CF = | 1 – AH = 86h (Function Not Supported) Any Error |

I claim:

1. A computer system comprising:

a processor;

a computer readable CMOS RAM memory device coupled to said processor, said CMOS RAM device having system configuration information programmed therein;

a computer readable non-volatile memory device coupled to said processor, said non-volatile memory having a first block of memory including CMOS RAM configuration information programmed therein;

means for reading the content of said non-volatile memory device, said means for reading being coupled to said processor;

means for erasing a specified block of said non-volatile memory device, said means for erasing being coupled to said processor;

means for writing said CMOS RAM configuration information into said non-volatile memory, said means for writing being coupled to said processor; and means for writing said CMOS RAM configuration information from said non-volatile memory into the CMOS RAM memory, said means for writing being coupled to said processor.

2. The computer system of claim 1 wherein said computer readable non-volatile memory device further includes a second block of memory having basic operating system processing logic and data stored therein.

3. The computer system of claim 2 wherein said operating system processing logic is a basic input/output system (BIOS).

4. The computer system of claim 3 further including a random access memory (RAM) coupled to said processor.

5. The computer system of claim 2 wherein said means for reading includes, means for selecting one of said first and second blocks of said non-volatile memory.

6. The computer system of claim 2 wherein said means for reading further includes, manual reading processing logic residing at a first location within said second block of said non-volatile memory device, and automatic reading processing logic residing at a second location within said second block of said non-volatile memory device.

7. The computer system of claim 6 wherein said automatic reading processing logic includes, first means for determining whether data residing within said CMOS RAM is valid, said first means being coupled to the processor; and second means for determining whether said first block of memory of said non-volatile memory device contains information, said second means being coupled to the processor.

8. The computer system of claim 6 wherein said automatic reading processing logic further includes first means for loading CMOS information from said first block of memory of said non-volatile memory device to said CMOS RAM, said first means for loading being coupled to the processor.

9. The computer system of claim 8 wherein said automatic reading processing logic further includes second means for loading said CMOS-RAM memory device with CMOS default information stored in said second block of said non-volatile memory device, said second means for loading being coupled to the processor.

10. The computer system of claim 1 wherein said means for writing is capable of customizing configuration information in said non-volatile memory.

11. In a computer system having a processor, a computer readable CMOS RAM device coupled to said processor, said CMOS RAM device having system configuration information programmed therein, a computer readable non-volatile memory device coupled to said processor, said non-volatile memory having a first block of memory including CMOS RAM configuration information therein, said non-volatile memory device having a second block of memory including manual reading processing logic, automatic reading processing logic, basic operating system processing logic, and CMOS default data, a computer-implemented process for storage and retrieval of CMOS configuration information comprising the steps of:

(a) selecting either a manual reading mode or a manual writing mode;

(b) activating said manual reading processing logic, if a manual reading mode was selected at step (a);

(c) loading information from said first block of memory of said non-volatile memory to said CMOS RAM device if said manual reading processing logic has been activated;

(d) activating said manual writing processing logic, if a manual writing mode was selected at step (a); and (e) writing said CMOS RAM device with information from said first block of memory if said manual writing processing logic has been activated.

12. The process recited in claim 11 further including the step of loading information from said first block of memory of said non-volatile memory to said CMOS RAM device if an automatic reading mode has been activated and if said first block of said non-volatile memory device contains information.

13. The process recited in claim 12 further including the step of loading information from said second block of memory of said non-volatile memory device to said CMOS RAM device if an automatic reading processing logic has been activated and if said first block of non-volatile memory does not contain information.

14. An apparatus for maintaining a backup copy of configuration information, comprising:

a first memory capable of storing said configuration information;

a second memory coupled to said first memory, said second memory adapted to receive configuration information from said first memory, said second memory capable of transmitting configuration information to said first memory; and a control mechanism coupled to said first memory and said second memory, said control mechanism adapted to control transfer of configuration information between said first and second memories.

15. The apparatus of claim 14 wherein said control mechanism automatically initiates a transfer of configuration information from said second memory to said first memory when said first memory contains invalid configuration information.

16. The apparatus of claim 14 wherein said control mechanism automatically initiates a transfer of configuration information from said first memory to said second memory in response to updating said configuration information in said first memory.

17. The apparatus of claim 14 wherein said control mechanism automatically initiates a transfer of configuration information from said second memory to said first memory during a power-on self test.

18. The apparatus of claim 14 wherein said first memory is a volatile memory and said second memory is a non-volatile memory.

19. The apparatus of claim 14 wherein said first memory is a CMOS RAM memory and said second memory is a FLASH memory.

20. The apparatus of claim 14 wherein said second memory includes a first block of memory and a second block of memory, said first block of memory including basic operating system processing logic, and said second block of memory including configuration information received from said first memory.

21. The apparatus of claim 14 wherein said second memory further includes default configuration information stored therein.

22. The apparatus of claim 21 wherein said control mechanism automatically initiates a transfer of said default configuration information from said second memory to said first memory when said first memory contains invalid configuration information and said second memory does not contain a backup copy of the configuration information.

23. A method for selecting configuration information from either a first memory or a second memory, said method comprising the steps of:

determining whether configuration information stored in said first memory is valid;

selecting configuration information from said first memory if said configuration information is valid;

selecting configuration information from said second memory if said configuration information in said first memory is invalid and said second memory contains a backup copy of said configuration information; and selecting default configuration information from said second memory if said configuration information in said first memory is invalid and said second memory does not contain a backup copy of said configuration information.

24. The method of claim 23 further including the step of automatically initiating a transfer of configuration information from said second memory to said first memory when said first memory contains invalid configuration information.

25. The method of claim 23 further including the step of initiating a transfer of configuration information from said first memory to said second memory in response to updating said configuration information in said first memory.

26. A computer system comprising:

a processor;

a computer readable CMOS RAM memory device coupled to said processor, said CMOS RAM device having system configuration information programmed therein;

a computer readable non-volatile memory device coupled to said processor, said non-volatile memory having a first block of memory including CMOS RAM configuration information programmed therein; and a program for transferring said system configuration information from said CMOS RAM memory device to said non-volatile memory device, and from said non-volatile memory device to said CMOS RAM memory device, said program stored in said non-volatile memory device.

* * * * *